US012059121B2

(12) United States Patent
Wang et al.

(10) Patent No.: US 12,059,121 B2
(45) Date of Patent: Aug. 13, 2024

(54) AIR DUCT ASSEMBLY AND CLEANING DEVICE

(71) Applicant: Anker Innovations Technology Co., Ltd., Changsha (CN)

(72) Inventors: Jixin Wang, Changsha (CN); Yongbin Yang, Changsha (CN); Suijun Wei, Changsha (CN)

(73) Assignee: Anker Innovations Technology Co., Ltd., Changsha (CN)

( * ) Notice: Subject to any disclaimer, the term of this patent is extended or adjusted under 35 U.S.C. 154(b) by 0 days.

(21) Appl. No.: 17/546,911

(22) Filed: Dec. 9, 2021

(65) Prior Publication Data

US 2022/0287526 A1 Sep. 15, 2022

(30) Foreign Application Priority Data

Mar. 11, 2021 (CN) ......................... 202110266716.6

(51) Int. Cl.
*A47L 9/16* (2006.01)
*B04C 3/06* (2006.01)
*B04C 9/00* (2006.01)

(52) U.S. Cl.
CPC ........... *A47L 9/1683* (2013.01); *A47L 9/1608* (2013.01); *A47L 9/165* (2013.01); *A47L 9/1666* (2013.01);
(Continued)

(58) Field of Classification Search
CPC ...... A47L 9/1409; A47L 9/165; A47L 9/1608; A47L 9/1616; A47L 9/1625;
(Continued)

(56) References Cited

U.S. PATENT DOCUMENTS

2005/0132680 A1* 6/2005 Wegelin ................ A47L 9/1409 55/429
2006/0230721 A1* 10/2006 Oh ........................ A47L 9/1625 55/345

(Continued)

FOREIGN PATENT DOCUMENTS

CN 1839738 A * 10/2006 ........... A47L 9/1625
KR 20130064769 * 6/2013 ........... A47L 9/1409

OTHER PUBLICATIONS

Wee, Hoon; Original Document of KR 20130064769, Jun. 18, 2013, p. 1-11 (Year: 2013).*

(Continued)

*Primary Examiner* — Laura C Guidotti
*Assistant Examiner* — Sidney D Full
(74) *Attorney, Agent, or Firm* — Banner & Witcoff, Ltd.

(57) ABSTRACT

Disclosed are an air duct assembly and a cleaning device. The air duct assembly includes a dirt collecting box, a filter, a cyclone separator and a fan. The dirt collecting box is provided with a dirt collecting cavity and the dirt collecting box is also provided with a dirt inlet and an air outlet communicated with the dirt collecting cavity. The dirt collecting cavity is provided with an air guiding structure, the filter is arranged in the air outlet, the cyclone separator is connected with the air outlet, and the fan is connected with the cyclone separator. The fan drives an air flow to enter into the dirt collecting cavity from the dirt inlet, and enter the cyclone separator from the air outlet after being guided by the air guiding structure, and then enter the fan from the cyclone separator.

6 Claims, 4 Drawing Sheets

(52) U.S. Cl.
CPC .................. *B04C 3/06* (2013.01); *B04C 9/00* (2013.01); *B04C 2009/002* (2013.01); *B04C 2009/005* (2013.01)

(58) Field of Classification Search
CPC .... A47L 9/1641; A47L 9/1666; A47L 9/1683; A47L 2201/024; B04C 3/06; B04C 9/00; B04C 2009/002; B04C 2009/005
USPC ............................................................ 62/244
See application file for complete search history.

(56) References Cited

U.S. PATENT DOCUMENTS

| | | | | |
|---|---|---|---|---|
| 2008/0235897 | A1* | 10/2008 | Kim | A47L 11/4013<br>901/1 |
| 2016/0000285 | A1* | 1/2016 | Liu | B01D 50/20<br>55/447 |
| 2017/0332867 | A1* | 11/2017 | Nam | A47L 9/2857 |
| 2019/0298131 | A1* | 10/2019 | Hu | A47L 9/122 |
| 2020/0146521 | A1* | 5/2020 | Kim | A47L 9/1683 |

OTHER PUBLICATIONS

Wee, Hoon; PE2E Translation of KR 20130064769, Jun. 18, 2013, p. 1-8 (Year: 2013).*
PE2E Translation of CN1839738; Oh, Jang-Keun; Multi-cyclone Dust Collector; Oct. 4, 2006; p. 1-6 (Year: 2006).*

* cited by examiner

AIR DUCT ASSEMBLY AND CLEANING DEVICE

CROSS-REFERENCE TO RELATED APPLICATIONS

The present disclosure claims the priority of Chinese Patent Application No. 202110266716.6, filed on Mar. 11, 2021, entitled “AIR DUCT ASSEMBLY AND CLEANING DEVICE”, which is hereby incorporated by reference in its entirety.

TECHNICAL FIELD

The present application relates to the technical field of cleaning devices, in particular to an air duct assembly and a cleaning device using the air duct assembly.

BACKGROUND

When a washing machine washes the ground, the fan in the washing machine rotates to form a negative pressure, and then garbage and sewage on the ground can be sucked out through the negative pressure, thus completing the cleaning work of cleaning the ground. However, the water vapor absorbed by the washing machine in the related technology is not effectively separated during the cleaning work, which makes the water vapor mildew and produce peculiar smell after staying in the air duct of the washing machine for a long time, or enter the fan and affect the working life of the fan.

SUMMARY

The main purpose of the present application is to provide an air duct assembly, which is aimed at effectively separating the water vapor sucked by a cleaning device, and reducing a possibility that the water vapor will mildew and produce peculiar smell after staying in the subsequent air duct in the cleaning device for a long time and enter the fan of the cleaning device to affect the working life of the fan.

To achieve the above purpose, the air duct assembly provided by the present application includes:

- a dirt collecting box, where a dirt collecting cavity is defined in the dirt collecting box, and a dirt inlet and an air outlet communicating with the dirt collecting cavity are also defined in the dirt collecting cavity, and an air guiding structure is arranged in the dirt collecting cavity;
- a filter arranged in the air outlet;
- a cyclone separator communicating with the air outlet; and
- a fan communicating with the cyclone separator for driving an air flow to enter the dirt collecting cavity through the dirt inlet, then enter the cyclone separator through the air outlet after being guided by the air guiding structure, and then enter the fan through the cyclone separator.

In one embodiment of the present application, the air guiding structure is provided with a dirt inlet channel communicating with the dirt inlet and the dirt collecting cavity;

the dirt collecting box is defined to have an up-down direction, and an outlet of the dirt inlet channel is higher than the dirt inlet in the up and down direction of the dirt collecting box.

In one embodiment of the present application, the air guiding structure includes a first plate, a second plate, a third plate and a fourth plate, the first plate, the second plate, the third plate and the fourth plate are all connected to a wall of the dirt collecting cavity and surround an outer side of the dirt inlet, and the first plate, the second plate, the third plate and the fourth plate are enclosed to form the dirt inlet channel.

In one embodiment of the present application, the dirt inlet and the air outlet are located on a side wall of the dirt collecting cavity, and are staggered in the up and down direction of the dirt collecting box.

In one embodiment of the present application, the outlet of the dirt inlet channel is arranged upward, the first plate is arranged between the dirt inlet and the air outlet, and the second plate is arranged facing the dirt inlet;

surfaces of ends of the first plate and the second plate away from the dirt inlet are higher than surfaces of ends of the third plate and the fourth plate away from the dirt inlet.

In one embodiment of the present application, one end of the first plate far away from the second plate is abutted against the side wall of the dirt collecting cavity, and an end of the second plate far away from the air outlet is spaced from side walls of the dirt collecting cavity.

In one embodiment of the present application, the dirt inlet channel includes a first channel section and a second channel section, the first channel section is communicated with the dirt inlet and is arranged in a helical shape, the second channel section is communicated with the first channel section and is arranged in a helical shape, and a helical direction of the second channel section is opposite to a helical direction of the first channel section, and an outlet of the dirt inlet channel is formed at an end of the second channel section far away from the first channel section; and/or in the up and down direction of the dirt collecting box, a position of the air outlet is higher than a position of the dirt inlet.

In one embodiment of the present application, the filter is a filter cotton; and/or at least two conical air flow channels are arranged in the cyclone separator; and/or an outlet of the cyclone separator is provided with a filter.

In one embodiment of the present application, the air duct assembly further includes a first duct communicating with the air outlet and the cyclone separator, air passing directions of the first duct and the air outlet forming an included angle.

In one embodiment of the present application, the air duct assembly further includes a second duct and a third duct, the second duct is communicated with the cyclone separator and the fan, the third duct is communicated with the fan and an outside world, and the third duct and the second duct form an included angle.

In one embodiment of the present application, 11. the third duct is bent.

The present application also provides a cleaning device, which includes an air duct assembly, the air duct assembly includes a dirt collecting box, a filter cyclone separator and a fan. The dirt collecting cavity is arranged in the dirt collecting box, the dirt collecting box is provided with a dirt inlet and an air outlet communicated with the dirt collecting box, an air guiding structure is arranged in the dirt collecting cavity. The filter is arranged in the air outlet, the cyclone separator is communicated with the air outlet, the fan is communicated with the cyclone separator, the fan drives the air flow to enter the dirt collecting cavity through the dirt inlet, and enter the cyclone separator through the air outlet after being guided by the air guiding structure, and then enter the fan through the cyclone separator.

When the air duct assembly of the technical solution of the present application is applied to a cleaning device, an air suction is carried out by starting the fan, so that negative pressure is formed at the dirt inlet of the dirt collecting box, and garbage and sewage on the ground can be sucked out. Further, after a mixture of garbage and sewage enters the dirt collecting cavity of the dirt collecting box. Because of the guiding and rectifying action of the air guiding structure, a flow path of the air flow in the dirt collecting cavity is relatively long, and the garbage and water droplets with relatively large sizes in the air flow can stay in the dirt collecting cavity of the dirt collection box under the action of gravity while a mixture of garbage and water droplets with relatively small sizes continues to advance with the air flow towards the air outlet. Further, when passing through the air outlet, the garbage and water droplets with relatively small sizes can be preliminarily filtered and intercepted by the filters arranged in the air outlet, and only the mixture of air, water vapor and dust is allowed to pass through. Further, when the mixture of air, water vapor and dust enters the cyclone separator, the air flow rotates at high speed in the cyclone separator to generate centrifugal force, through which the water vapor and dust can be thrown to a side wall or a bottom wall of an air flow channel in the cyclone separator for collection; or water drops are fully vaporized. Further, when the air flow passes through a high-precision filter at the outlet of the cyclone separator, the water vapor and dust in the air flow can be filtered and intercepted again by the high-precision filter, so that only the air is allowed to continue and enter the fan. Therefore, through a gravity separation action in the dirt collecting box, a primary filtration and interception action in the air outlet, a centrifugal separation action of the cyclone separator and a re-interception and filtration of the high-precision filter, the water vapor and dust sucked by the cleaning device are effectively separated by the air duct assembly in the present application, so that the cleaning device has only air in the subsequent air duct after the cyclone separator, so that a possibility that the water vapor will mildew after staying in the subsequent air duct in the cleaning device for a long time and produce peculiar smell and enter the fan of the cleaning device and affect a working life of the fan is reduced. And the service life of the filter and other components in the base station are also prolonged.

BRIEF DESCRIPTION OF THE DRAWINGS

In order to more clearly explain the embodiments of the present application or the technical proposal in the related art, the drawings required for use in the description of embodiments or prior art will be briefly described below. It will be apparent that the drawings described below are only some embodiments of the present application, and other drawings can be obtained from the structure shown in these drawings without any creative effort by those of ordinary skill in the art.

The realization of the purpose, functional features and advantages of the present application will be further explained with reference to the accompanying drawings in connection with the embodiment.

DETAILED DESCRIPTION OF THE EMBODIMENTS

A clear and complete description of the technical aspects of the embodiments of the present application will be given below in conjunction with the accompanying drawings in the embodiments of the present application, and it will be apparent that the described embodiments are only part of the embodiments of the present application, not all of them. Based on the embodiments in the present application, all other embodiments obtained without creative effort by those of ordinary skill in the art fall within the scope of protection of the present application.

It should be noted that all directivity indications (such as up, down, left, right, front, back, etc.) in the embodiment of the present application are only used to explain the relative positional relationship, movement situation, etc. among the components in a specific posture (as shown in the attached drawings), and if the specific posture changes, the directivity indications will change accordingly.

In the present application, unless expressly specified and limited, the terms “connected”, “fixed”, etc. should be understood in a broad sense. For example, unless expressly defined, “fixed” can be a fixed connection, a detachable connection, or a whole; it can be a mechanical connection or an electrical connection; it can be a direct connection or an indirect connection through an intermediate medium, or can be an internal connection between two elements or an interactive relationship between two elements. The specific meanings of the above terms in the present application can be understood by those of ordinary skill in the art on a case-by-case basis.

In addition, the descriptions in the present application relating to “first”, “second” and the like are for descriptive purposes only and cannot be construed as indicating or implying their relative importance or implying the number of technical features indicated. Thus, the features defined as “first”, “second” may explicitly or implicitly include at least one of the features. In addition, the technical solutions among the various embodiments may be combined with each other, but must be on the basis that the person of ordinary skill in the art can realize it. When a combination of technical solutions conflicts or cannot be realized, it should be considered that the combination of technical solutions does not exist and is not within the scope claimed by the present application.

Figure 1:
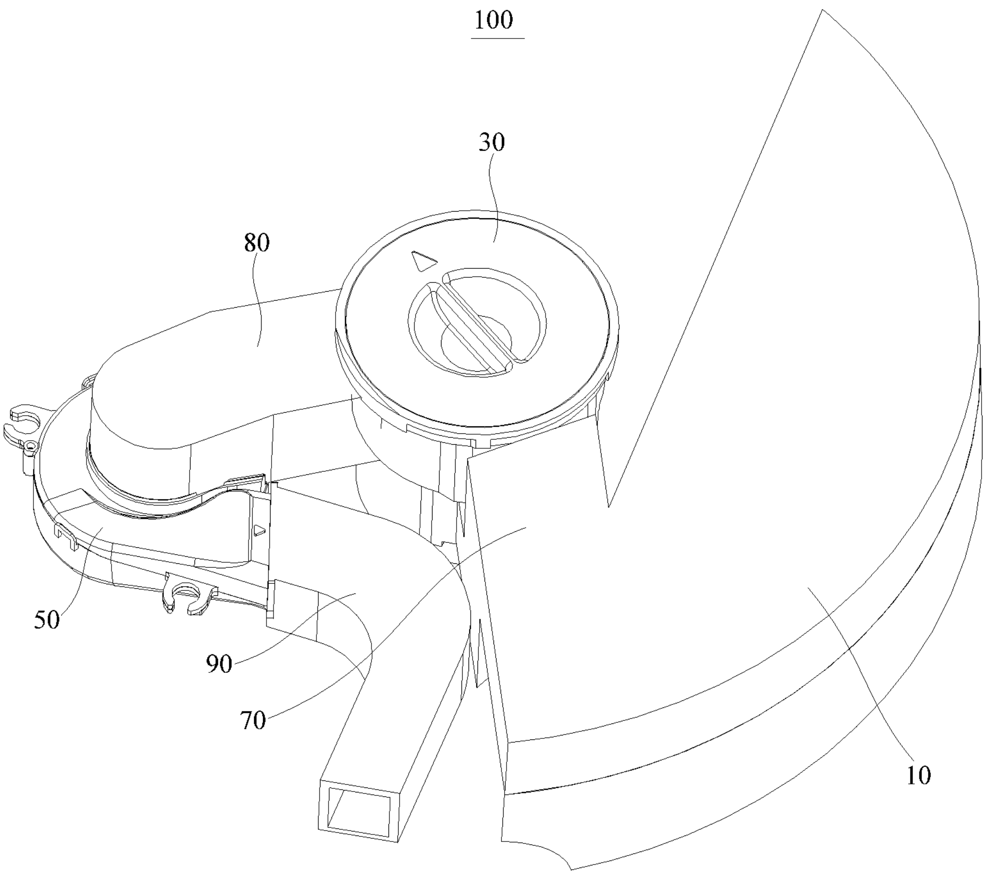
FIG. 1 is a structural schematic view of an embodiment of an air duct assembly of the present application.
Figure 2:
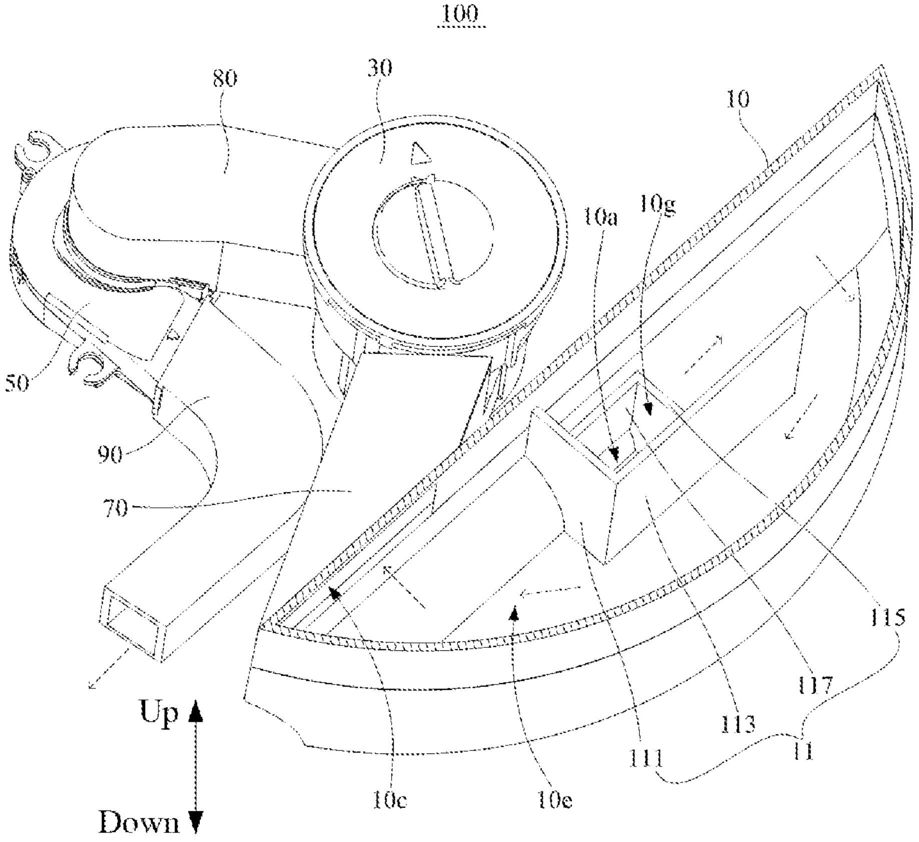
FIG. 2 is a partial cross-sectional schematic view of the air duct assembly of FIG. 1.

With reference to FIG. 1 and FIG. 2, the present application proposes an air duct assembly 100.

In an embodiment of the present application, the air duct assembly 100 includes a dirt collecting box 10, a filter, a cyclone separator 30 and a fan 50. The dirt collecting box 10 is provided with a dirt collecting cavity 10*e*, and a dirt inlet 10*a* and an air outlet 10*c* which communicate with the dirt collecting cavity 10*e*. The dirt collecting cavity is provided with an air guiding structure. The filter is arranged in the air outlet 10*c*. The cyclone separator 30 is communicated with the air outlet 10*c*. The fan 50 is communicated with the cyclone separator 30. The fan 50 drives an air flow to enter the dirt collecting cavity 10*e* through the dirt inlet 10*a*, and then enter the cyclone separator 30 through the air outlet 10*c* after being guided by the air guiding structure 11, and then enter the fan 50 from the cyclone separator 30.

In an embodiment of the present application, the dirt collecting cavity 10*e* of the dirt collecting box 10 can be used for initially collecting and accommodating garbage and sewage entering through the dirt inlet 10*a* when the cleaning device cleans the ground, so that the cleaning device can continuously clean the ground. A projection of the dirt collecting box 10 on a horizontal plane can be a semicircular structure, a rectangular structure, a square structure, or the like, so that the dirt collecting box 10 has a regular shape and facilitates molding and manufacturing. The air guiding structure 11 can be configured for guiding and rectifying the air flow entering the dirt collecting cavity 10*e* so that the air flow has a relatively long flow path in the dirt collecting cavity 10*e*, thereby relatively large garbage and water droplets with relatively large size are retained in the dirt collecting cavity 10*e*. The filter can be configured to filter and block garbage and water droplets of relatively small size that move to the air outlet with the air flow, reducing the possibility of them entering the cyclone separator 30 as the air flow moves on. In particular, the filter can be fixed in the air outlet 10*c* by glue bonding, the dirt collecting box 10 is fixed by a clamping groove or connected by screws, etc. This application is not limited to this, as long as the filter can be stably arranged in the air outlet 10*c* to perform a stable filtering and blocking work. The cyclone separator 30 can be used for the entry of the air flow passing through the air outlet 10*c*, since the cyclone separator 30 can make the incoming air flow to have a high-speed rotating motion to generate a centrifugal, the centrifugal can make water vapor in the air flow be thrown to a side wall or a bottom wall of the air flow channel of the cyclone separator 30, or make the water particles be fully vaporized to realize the separation of water vapor from the air flow. The cyclone separation principle of the cyclone separator 30 already exists in the prior art, thus the specific structure of the cyclone separator 30 will not be described in detail here. The fan 50 can be used to provide a power to drive the air flow on the ground to pass through the dirt inlet 10*a*, the dirt collecting box 10, the filter, the cyclone separator 30 and the fan 50, and be discharged to the outside by the fan 50, so that a negative pressure is generated at the dirt inlet 10*a* to absorb garbage and sewage on the ground.

When the air duct assembly 100 of the technical proposal of the present application is applied to a cleaning device, the fan 50 is started to exhaust air, so that negative pressure is formed at the dirt inlet 10*a* of the dirt collecting box 10, and garbage and sewage on the ground can be sucked out. After the mixture of the garbage and sewage enters the dirt collecting cavity 10*e* of the dirt collecting box 10, through the guiding and rectifying action of the air guiding structure 11, the flow path of the air flow in the dirt collecting cavity 10*e* is relatively long, and the garbage and water droplets with relatively large sizes mixed in the air flow can stay in the dirt collecting box 10 under the action of gravity, while the mixture of garbage and water droplets with relatively small sizes continues to advance towards the air outlet 10*c* with the air flow. When to pass through the air outlet 10*c*, the garbage and water droplets with relatively small sizes can be filtered and blocked by the filter provided in the air outlet 10*c*, and only the mixture of air and water vapor is allowed to pass through. After that, after the mixture of air and water vapor enters the cyclone separator 30, the air flow rotates at high speed in the cyclone separator 30 to generate a centrifugal force, through which the water vapor can be thrown onto the side wall or bottom wall of the air flow channel in the cyclone separator 30, or the water particles are sufficiently vaporized and only air is allowed to continue and enter the fan 50. Therefore, the air duct assembly 100 in the present embodiment effectively separates the water vapor absorbed by the cleaning device through the gravity separation action in the dirt collection box 10, the filtration separation action in the air outlet 10*c* and the centrifugal separation action by the cyclone separator 30, only air stays in the subsequent air duct of the cleaning device after the cyclone separator 30, thereby reducing the possibility that water vapor will mildew and generate peculiar smell after staying in the subsequent air duct in the cleaning device for a long time and enter the fan 50 of the cleaning device to affect the working life of the fan 50.

Referring to FIG. 2, in an embodiment of the present application, the air guiding structure 11 is provided with a dirt inlet channel 10*g* communicating with the dirt inlet 10*a* and the dirt collecting cavity 10*e*. The dirt collecting box 10 is defined to have an up-and-down direction, in which an outlet of the dirt inlet channel 10*g* is higher than the dirt inlet 10*a* in the up-and-down direction of the dirt collecting box 10.

It can be understood that the outlet of the dirt inlet channel 10*g* is provided higher than the dirt inlet 10*a*, so that when the air flow is blown out from the outlet of the dirt inlet channel 10*g*, the air flow is at a certain height above a bottom wall of the dirt collecting chamber 10*e*. At this time, garbage and water droplets with relatively large sizes included in the air flow are suspended when they enter the dirt collecting cavity 10*e* from the outlet of the dirt inlet channel 10*g*, and fall to the bottom wall of the dirt collecting cavity 10*e* under the action of their own gravity, thus, the garbage and water droplets with relatively large sizes start to be separated from the air flow by their own gravity as soon as they enter the dirt collecting cavity 10*e*. Therefore, the garbage and water droplets with relatively large sizes are separated more quickly and sufficiently in the dirt collecting cavity 10*e*, so as to improve a separation effect of the garbage and water droplets with relatively large sizes. Meanwhile, with this arrangement, the air guiding structure 11 can prevent the dirt in the dirt collecting cavity 10*e* from flowing through the dirt inlet 10*a*, thereby reducing the possibility of the dirt in the dirt collecting cavity 10*e* flowing out of the dirt inlet 10*a*.

Referring to FIG. 2, in one embodiment of the present application, the air guiding structure includes a first plate 111, a second plate 113, a third plate 115 and a fourth plate 117. The first plate 111, the second plate 113, the third plate 115 and the fourth plate 117 are all connected to walls of the dirt collecting cavity 10*e* and surround an outer side of the dirt inlet 10*a*. The first plate 111, the second plate 113, the third plate 115 and the fourth plate 117 form the dirt inlet channel 10*g*.

It can be understood that the air guiding structure 11 is formed by enclosing the first plate 111, the second plate 113, the third plate 115, and the fourth plate 117, so that the structure of the air guiding structure 11 is relatively simple and the shape is relatively regular, thereby facilitating the manufacture of the air guiding structure 11. Of course, in other embodiments, the air guiding structure 11 can have a tubular structure or the dirt inlet channel 10*g* can be formed by the walls of the dirt collecting cavity 10*e*.

Figure 4:
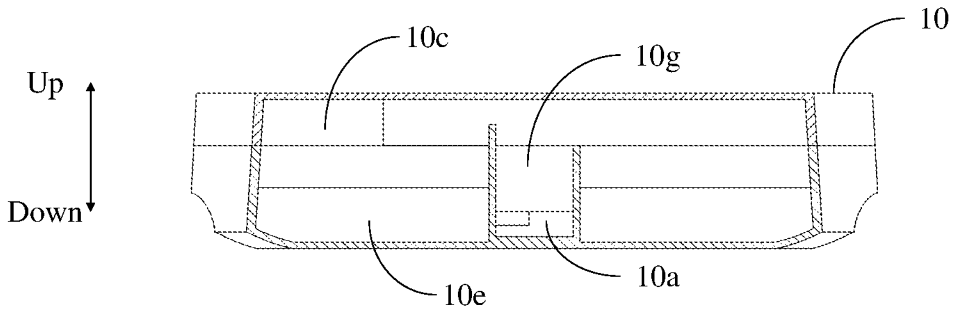
FIG. 4 is a cross-section view of the dirt collecting box of the air duct assembly in FIG. 2.
Figure 5:
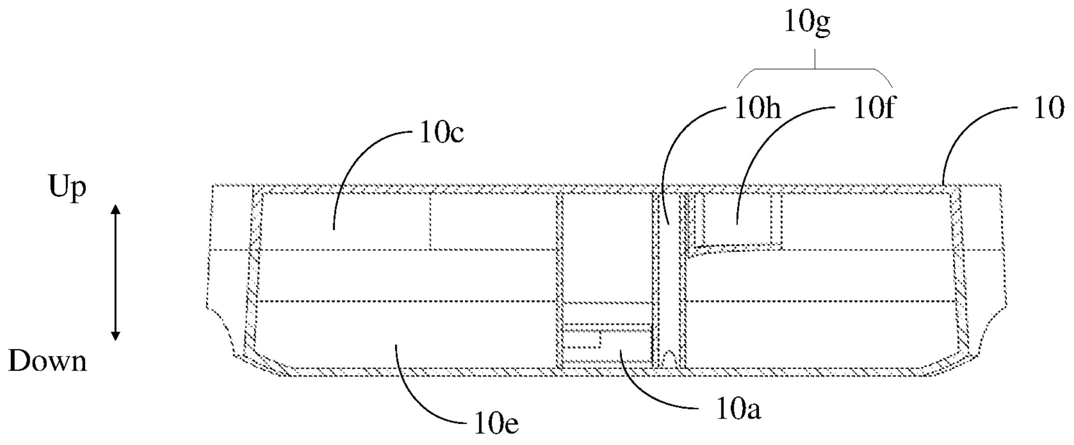
FIG. 5 is a cross-section view of the dirt collecting box of the air duct assembly in FIG. 3.

Referring to FIG. 4 and FIG. 5, in some embodiments of the present application, the dirt inlet 10*a* and the air outlet 10*c* are located on a same wall of the dirt collecting cavity 10*e* and staggered in the up-and-down direction of the dirt collecting box 10.

It can be understood that the dirt inlet 10_a_ and the air outlet 10_c_ are located on the same wall of the dirt collecting cavity 10_e_ and are staggered, so that the air flow can change direction and flow to the air outlet 10_c_ in a circuitous manner after entering the dirt collecting cavity 10_e_ from the dirt inlet 10_a_. At this time, the flow path of the air flow is relatively long, so that the garbage with relatively large sizes in the air flow can have a certain separation time, and be fully retained in the dirt collecting cavity 10_e_ under the action of its own gravity, thereby improving the separation effect of the garbage with relatively large sizes. In particular, the dirt inlet 10_a_ can be provided on a center line of the wall of the dirt collecting cavity 10_e_, and the air outlet 10_c_ is located on one side of the wall of the dirt collecting cavity 10_e_, so that the dirt inlet 10_a_ can be approximately located at the center of the bottom of the cleaning device to uniformly clean the ground under the bottom of the cleaning device, and at the same time, the inlet port and the air outlet 10_c_ are staggered for a distance to ensure the length of the flow path of the air flow in the dirt collecting cavity 10_e_. Of course, it is also possible that the dirt inlet 10_a_ and the air outlet 10_c_ are provided on two opposite sides of a wall of the dirt collecting cavity 10_e_ respectively. In addition, it should be noted that the present application is not limited to this, in other embodiments, it is also possible that the dirt inlet 10_a_ and the air outlet 10_c_ are located on different walls of the dirt collecting cavity 10_e_, for example, they can be provided on two opposite walls of the dirt collecting cavity 10_e_.

Referring to FIG. 2, in an embodiment of the present application, the outlet of the dirt inlet channel 10_g_ is disposed upward, the first plate 111 is disposed between the dirt inlet 10_a_ and the air outlet 10_c_, and the second plate 113 is disposed directly opposite to the dirt inlet 10_a_. Surfaces of ends of the first plate 111 and the second plate 113 away from the dirt inlet 10_a_ are higher than those of the third plate 115 and the fourth plate 117 away from the dirt inlet 10_a_.

Understandably, surfaces of ends of the first plate 111 and the second plate 113 away from the dirt inlet 10_a_ are disposed relatively high. The air flow flowing out of the dirt inlet channel 10_g_ can be blocked and guided by the first plate 111 and the second plate 113, and flows in an extending direction of the second plate 113, that is, flows away from the air outlet 10_c_, and then flows from an outer side of the second plate 113 toward the air outlet 10_c_ in a circuitous way under the blocking action of the wall of the dirt collecting cavity 10_e_. At this time, the flow path of the air flow in the dirt collecting cavity 10_e_ is further lengthened, thereby further facilitating a separation of garbage with relatively large sizes in the air flow. At the same time, this arrangement is also convenient for stacking and collecting garbage in various areas in the dirt collecting cavity 10_e_, thereby improving a space utilization efficiency of the dirt collecting box 10. In order to simplify the structure of the air guiding structure 11 and facilitate a manufacture of the air guiding structure 11, the first plate 111, the second plate 113, the third plate 115, and the fourth plate 117 can all have a vertical plate-like structure, that is, the projection of the dirt inlet channel 10_g_ formed by an enclosure of the first plate 111, the second plate 113, the third plate 115, and the fourth plate 117 is in a square shape on the horizontal plane. At this time, portions of a side wall of the dirt collecting cavity 10_e_ provided with the dirt inlet can have an arc shape protruding toward an inside of the dirt collecting cavity 10_e_, or have an inclined shape toward the inside of the dirt collecting cavity 10_e_ in a direction facing a bottom wall of the dirt collecting cavity 10_e_, so that lower ends of the first plate 111, the third plate 115, and the fourth plate 117 are connected to the side wall of the dirt collecting cavity 10_e_. Specifically, a lower end of the first plate 111 can be connected to the side wall of the dirt collecting cavity 10_e_ provided with the dirt inlet 10_a_ and the bottom wall of the dirt collecting cavity 10_e_, a lower end of the second plate 113 is connected to the bottom wall of the dirt collecting cavity 10_e_, the third plate 115 is opposite to the first plate 111, a lower end of the third plate 115 is connected to the side wall of the dirt collecting cavity 10_e_ defined with the dirt inlet 10_a_ and the bottom wall of the dirt collecting cavity 10_e_, the fourth plate 117 is opposite to the second plate 113, and a lower end of the fourth plate 117 is connected to the side wall of the dirt collecting cavity 10_e_ defined with the dirt inlet 10_a_. Of course, the present application is not limited to this. In other embodiments, the lower ends of the first plate 111, the second plate 113, the third plate 115, and the fourth plate 117 can be connected only to the side wall of the dirt collecting cavity 10_e_ defined with the dirt inlet 10_a_.

Referring to FIG. 2, in an embodiment of the present application, one end of the first plate 111 away from the second plate 113 abuts against the side wall of the dirt collecting cavity 10_e_, and an end of the second plate 113 away from the air outlet 10_c_ is spaced from side walls of the dirt collecting cavity 10_e_.

Understandably, at this time, the first plate 111 and the second plate 113 are relatively long, so that the air flow can be better blocked and a guiding effect of the first plate 111 and the second plate 113 on the air flow can be improved, so that after being blocked by the first plate 111 and the second plate 113, the air flow can sufficiently flow in a direction away from the air outlet 10_c_, and then change a direction and circuitously flow to the air outlet 10_c_ under blocking of the wall of the dirt collecting cavity 10_e_. In particular, a side edge of one end of the first plate 111 away from the second plate 113 can have a connection relationship with the side wall of the dirt collecting cavity 10_e_, that is, the side edge is connected to the side wall of the dirt collecting cavity 10_e_, so as to ensure sealing between them. Further, the wall of the dirt collecting cavity 10_e_ facing the dirt inlet 10_a_ can have an arc-shaped structure and a concave surface of the wall faces the dirt inlet 10_a_, thereby making the dust collecting box have a semicircular structure substantially, the space of the flow path that the air flow is blocked by the arc-shaped wall of the dirt collecting cavity 10_e_ and circuitously flows to the air outlet 10_c_ being relatively long, and an air pressure in this space being relatively small, and facilitating the garbage with relatively large sizes to be retained in the dirt collecting cavity 10_e_.

Referring to FIG. 2, in an embodiment of the present application, a position of the dirt inlet 10_a_ is lower than a position of the air outlet 10_c_ in an up and down direction of the dirt collecting box 10.

It can be understood that the position of the dirt inlet 10_a_ is set lower than the position of the air outlet 10_c_, so that the air flow has a tendency to flow upward when it flows from the dirt inlet 10_a_ to the air outlet 10_c_ in the dirt collection box 10. At this time, the garbage with relatively large sizes moves downward under the action of gravity, while the mixture of garbage and water droplets with relatively small sizes moves upward with the air flow, which makes the garbage with relatively large sizes easier to be separated from the air flow. At the same time, this arrangement further makes the position of the air outlet 10_c_ relatively high and reduces a possibility of the air outlet 10_c_ being covered by garbage in the dirt collection box 10, so that the amount of the garbage contained in the dirt collection box 10 can be increased and a utilization efficiency of the space in the dirt collection box 10 can be improved. Of course, the present application is not limited thereto, and in other embodiments, the position of the dirt inlet 10*a* and the position of the air outlet 10*c* can be at the same level in the vertical direction of the dirt collecting box 10.

Figure 3:
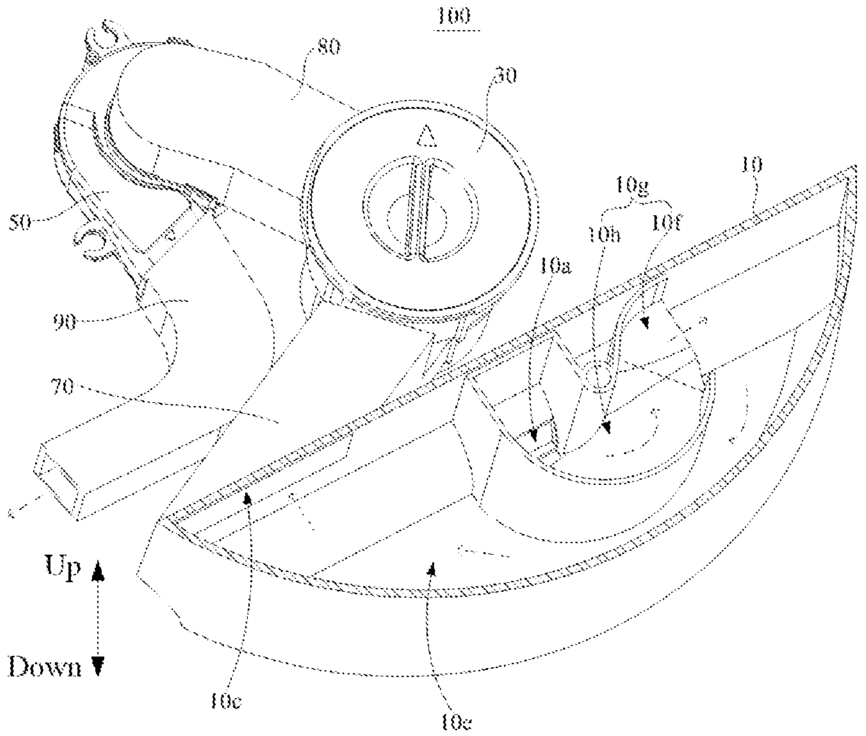
FIG. 3 is a partial cross-sectional diagram of another embodiment of the air duct assembly of the present application.

Referring to FIG. 3 and FIG. 5, in an embodiment of the present application, the dirt inlet channel 10*g* includes a first channel section 10*h* and a second channel section 10*f*. The first channel section 10*h* communicates with the dirt inlet 10*a* and is arranged in a helical shape, the second channel section 10*f* communicates with the first channel section 10*h* and is arranged in a helical shape, a helical direction of the second channel section 10*h* is opposite to a helical direction of the first channel section 10*h*, and the outlet of the dirt inlet channel 10*g* is formed at an end of the second channel section 10*h* far away from the first channel section 10*h*.

It will be understood that the dirt inlet channel 10*g* is composed of a first channel section 10*h* and a second channel section 10*f* arranged in helical shapes, so that after the air flow passes through the first channel section 10*h* and the second channel section 10*f* in turn, a centrifugal force is produced by rotating of the air flow at a high speed. At this time, the relatively large garbage and water droplets mixed in the air flow can be fully thrown onto the side wall of the dirt collecting cavity 10*e* by the centrifugal force, and then flow down along the side wall of the dirt collecting cavity 10*e* to the bottom of the cavity under an action of gravity to be settled and collected in the dirt collecting cavity 10*e*. The air flow can continue to flow in the direction toward the air outlet 10*a* since the air flow diffuses directly from the second channel section 10*f*. Therefore, the arrangement of the air guiding structure 11 enables the relatively large garbage and water droplets to be better separated from the air flow by a centrifugal separation action of the air guiding structure once entering the dust collecting cavity, thereby improving the separation and collection effect of garbage and water droplets with relatively large sizes in the dirt collecting cavity 10*e*. Further, in order to enable relatively large garbage and water droplets to have a relatively high height and better fall after exiting from the dirt inlet channel 10*g*, and reduce a possibility of dirt in the dirt collecting cavity 10*e* flowing backwards and exiting from the dirt inlet channel 10*g*, the first channel section 10*h* can be arranged in the helical shape extending upward and the second channel section 10*f* can be arranged in the helical shape extending horizontally. Of course, the present application is not limited thereto, in other embodiments, both the first channel section 10*h* and the second channel section 10*f* are arranged in the helical shapes extending horizontally or extending upward. In addition, in order to better prolong the flow path of the air flow in the dirt collecting cavity 10*e*, an end of the first channel section 10*h* away from the dirt inlet can be helically extended along a direction away from the air outlet 10*c*, so that the dirt inlet is located between the outlet of the dirt inlet channel 10*g* and the air outlet 10*c*. The dirt inlet channel 10*g* can be formed by enclosing a bottom plate and three connected side plates, and of course can further include a top plate covering the three connected side plates.

In one embodiment of the present application, the filter is filter cotton.

It can be understood that the filter cotton has a good adsorption performance and a certain filtration volume, which can improve the filtration and blocking effect of the filter on garbage and water droplets with relatively small sizes. Of course, the present application is not limited thereto, in other embodiments, the filter can be a gauze screen or a steel mesh or the like.

In one embodiment of the present application, at least two conical air flow channels are provided within the cyclone separator 30.

It can be understood that an arrangement of at least two conical air flow channels enables the air flow entering the cyclone separator 30 to simultaneously rotate at high speed in the at least two conical air flow channels to simultaneously separate water vapor in the air flow through the at least two conical air flow channels, thereby improving the water vapor separation effect of the cyclone separator 30.

In one embodiment of the present application, the outlet of the cyclone separator 30 is provided with a filter.

It can be understood that the air flowing out of the cyclone separator 30 can be further filtered by the filter, so as to further block and filter water mist and dust, thereby more advantageously ensuring that the air flow flowing out of the cyclone separator 30 includes only air and ensuring the separation effect of water vapor in the subsequent air duct of the cleaning device after the cyclone separator 30.

Referring to FIG. 1 or FIG. 2, in an embodiment of the present application, the air duct assembly 100 further includes a first duct 70, the first duct 70 is communicated with the air outlet 10*c* and the cyclone separator 30, and air passing directions of the first duct 70 and the air outlet 10*c* form an included angle.

It can be understood that the air outlet 10*c* and an inlet of the cyclone separator 30 can be better communicated through opposite ends of the first duct 70, so that the communication between the air outlet 10*c* and the cyclone separator 30 can be improved. The air passing directions of the first duct 70 and the air outlet 10*c* form an included angle, so that distribution of the first duct 70, the cyclone separator 30 and the dirt collecting box 10 is more compact, thereby reducing the overall volume of the air duct assembly 100 and facilitating the installation of the air duct assembly 100 on the cleaning device. A cross-sectional shape of the first duct 70 can be square or circular, so that the shape of the first duct 70 is regular and easy to be molded and manufactured. Specifically, the space of the first duct 70 can be set to adapt to the shape of the air outlet 10*c*. Of course, it should be noted that in other embodiments, it is also possible to communicate the air outlet 10*c* directly with an outlet of the cyclone separator 30.

Referring to FIG. 1 or FIG. 2, in an embodiment of the present application, the air duct assembly 100 further include a second duct 80 communicated with the cyclone separator 30 and the fan 50, and a third duct 90 communicated with the fan 50 and an outside, and the third duct 90 and the second duct 80 form an included angle.

It will be appreciated that the cyclone separator 30 and the fan 50 can be better communicated through opposite ends of the second duct 80, thereby improving convenience of communication between an inlet of the fan 50 and the outlet of the cyclone separator 30. The air flowing out of the outlet of the fan 50 can be guided through the third duct 90, so that the air flowing out of the outlet of the fan 50 can be discharged to the outside along a preset flow path. The third duct 90 and the second duct 80 form an included angle, so that a distribution of the cyclone separator 30, the second duct 80, the fan 50 and the third duct 90 is more compact, thereby further reducing the overall volume of the air duct assembly 100 and facilitating an installation of the air duct assembly 100 on the cleaning device. Further, the included angle formed between the first duct 80 and the second duct 90 can be disposed towards the dirt collecting box 10 to further reduce occupancy of space by those components.

Referring to FIG. 1 or FIG. 2, in one embodiment of the present application, the third duct 90 is bent and arranged enlongatedly.

It will be appreciated that this arrangement reduces a possibility of interference between an end of the third duct 90 away from the fan 50 and the first duct 70 or the dirt collecting box 10, thereby facilitating a stable arrangement of the various mechanisms. At the same time, when the air flows in the third duct 90, since the third duct 90 is bent and extended, the third duct 90 can collide with an inner wall of the third duct 90 to reduce a flow speed of the air, thereby reducing a noise generated at an outlet of the third duct 90. Particularly, the third duct 90 can be bent once, twice or more times.

The present application also provides a cleaning device, which includes an air duct assembly 100. A specific structure of the air duct assembly 100 refers to the above-mentioned embodiments. Since the cleaning device adopts all the technical schemes of the above-mentioned embodiments, it has at least all the beneficial effects brought by the technical schemes of the above-mentioned embodiments, which will not be repeated here. The cleaning device can be a ground washer, a ground sweeping robot, a vacuum cleaner, etc. The air duct assembly 100 can be arranged in a body of the cleaning device.

The above is only preferred embodiments of the present application, and are not therefore limiting the patent scope of the present application. Any equivalent structural transformation made by using the contents of the present specification and drawings, or any direct/indirect application in other related technical fields, under the inventive concept of the present application, is included in the patent protection scope of the present application.

The invention claimed is:

1. An air duct assembly comprising:

a dirt collecting box, wherein a dirt collecting cavity is defined in the dirt collecting box, and a dirt inlet and an air outlet communicating with the dirt collecting cavity are also defined in the dirt collecting cavity, and an air guiding structure is arranged in the dirt collecting cavity;

a filter arranged in the air outlet;

a cyclone separator communicating with the air outlet; and a fan communicating with the cyclone separator for driving an air flow to enter the dirt collecting cavity through the dirt inlet, then enter the cyclone separator through the air outlet after being guided by the air guiding structure, and then enter the fan through the cyclone separator;

wherein, the dirt inlet and the air outlet are located on a same side wall of the dirt collecting cavity and are staggered in an up and down direction of the dirt collecting box, the dirt inlet is provided on a center line of the side wall on a lower arc part of the side wall, and approximately on a center of a bottom of the dirt collecting box, the air outlet is provided on an upper flat part of the sidewall; and the dirt inlet and the air outlet face a same direction;

wherein the air guiding structure is provided with a dirt inlet channel communicating with the dirt inlet and the dirt collecting cavity and an outlet of the dirt inlet channel is higher than the dirt inlet in the up and down direction of the dirt collecting box;

wherein the air guiding structure comprises a first plate, a second plate, a third plate and a fourth plate, the first plate, the second plate, the third plate and the fourth plate are all connected to a wall of the dirt collecting cavity and surround an outer side of the dirt inlet, and the first plate, the second plate, the third plate and the fourth plate are enclosed to form the dirt inlet channel;

wherein the outlet of the dirt inlet channel is arranged upward, the first plate is arranged between the dirt inlet and the air outlet, and the second plate is arranged facing the dirt inlet;

wherein surfaces of ends of the first plate and the second plate away from the dirt inlet are higher than surfaces of ends of the third plate and the fourth plate away from the dirt inlet;

wherein one end of the first plate far away from the second plate is abutted against the side wall of the dirt collecting cavity, and an end of the second plate far away from the air outlet is spaced from side walls of the dirt collecting cavity.

2. The air duct assembly of claim 1, wherein the filter is a filter cotton;

and the filter is provided in the air outlet of the dirt collecting box.

3. The air duct assembly of claim 1, wherein the air duct assembly further comprises a first duct communicating with the air outlet and the cyclone separator, air passing directions of the first duct and the air outlet form an included angle.

4. The air duct assembly of claim 1, wherein the air duct assembly further comprises a second duct and a third duct, wherein the second duct is communicated with the cyclone separator and the fan, and the third duct is communicated with the fan and outside, the third duct and the second duct form an included angle.

5. The air duct assembly of claim 4, wherein the third duct is bent.

6. A cleaning device comprising the air duct assembly of claim 1.

* * * * *